US 11,489,630 B2

(12) United States Patent
Tang

(10) Patent No.: US 11,489,630 B2
(45) Date of Patent: Nov. 1, 2022

(54) METHOD FOR TRANSMITTING UPLINK SIGNAL AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 42 days.

(21) Appl. No.: 16/711,096

(22) Filed: Dec. 11, 2019

(65) Prior Publication Data
US 2020/0119855 A1 Apr. 16, 2020

Related U.S. Application Data

(63) Continuation of application No. PCT/CN2018/086611, filed on May 11, 2018.

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1671* (2013.01); *H04L 5/0048* (2013.01);
(Continued)

(58) Field of Classification Search
None
See application file for complete search history.

(56) References Cited

U.S. PATENT DOCUMENTS

2012/0127931 A1 5/2012 Gaal et al.
2013/0195048 A1 8/2013 Ekpenyong et al.
(Continued)

FOREIGN PATENT DOCUMENTS

CN 1848978 A 10/2006
CN 102238644 A 11/2011
(Continued)

OTHER PUBLICATIONS

Ericsson, "RAN1 decisions for WI Shortened TTI and processing time for LTE (LTE_sTTIandPT)—per topic", Feb. 26-Mar. 2, 2018, 3GPP TSG RAN WG1 Meeting #92, pp. 13 (Year: 2018) (Year: 2018).*

(Continued)

*Primary Examiner* — Steve R Young
(74) *Attorney, Agent, or Firm* — Ladas & Parry LLP

(57) ABSTRACT

The present application discloses a method for transmitting an uplink signal and a terminal device, including: receiving, by a terminal device, uplink grant information transmitted by a network device, where the uplink grant information is used to instruct the terminal device to transmit a first uplink channel in a first sub-slot and to transmit a second uplink channel in a second sub-slot, where the first uplink channel comprises first uplink data and does not comprise a reference signal, the second uplink channel comprises the first reference signal, the first sub-slot and the second sub-slot are adjacent sub-slot on a first carrier, the first sub-slot is located previous to the second sub-slot, and the first reference signal is used to demodulate the first uplink data; determining, by the terminal device, whether to transmit the first uplink channel in the first sub-slot according to a priority of an uplink channel.

2 Claims, 4 Drawing Sheets

(51) Int. Cl.
- *H04W 72/10* (2009.01)
- *H04L 5/00* (2006.01)
- *H04L 1/16* (2006.01)

(52) U.S. Cl.
CPC ....... *H04W 72/0413* (2013.01); *H04W 72/10* (2013.01); *H04W 72/044* (2013.01)

(56) References Cited

U.S. PATENT DOCUMENTS

| | | |
|---|---|---|
| 2014/0016475 A1 | 1/2014 | Zhou et al. |
| 2016/0044606 A1 | 2/2016 | Yin |
| 2016/0100372 A1 | 4/2016 | Dinan |
| 2020/0274660 A1* | 8/2020 | Xiong .............. H04L 5/0012 |

FOREIGN PATENT DOCUMENTS

| | | |
|---|---|---|
| CN | 102685707 A | 9/2012 |
| CN | 104125040 A | 10/2014 |
| CN | 104521298 A | 4/2015 |
| CN | 104936300 A | 9/2015 |
| CN | 105917719 A | 8/2016 |
| CN | 106537997 A | 3/2017 |
| CN | 107949999 A | 4/2018 |
| RU | 2638178 C1 | 12/2017 |
| WO | 2017135745 A | 8/2017 |
| WO | 2019213971 | 11/2019 |

OTHER PUBLICATIONS

Ericsson, "RAN1 decisions for WI Shortened TTI and processing time for LTE (LTE sTTIandPT)—per topic", Feb. 26-Mar. 2, 2018, 3GPP TSG RAN WG1 Meeting #92, pp. 1-43 (Year: 2018).*

Ericsson, "RAN1 decisions for WI Shortened TTI and processing time for LTE (LTE sTTIandPT)—per topic", Feb. 26-Mar. 2, 2018, 3GPP TSG RAN WG1 Meeting #92, pp. 1-43 (Year: 2018).*

Ericsson/LG Electronics, "Missing agreement from agreed text proposals at RAN1#92", Apr. 16-20, 2018, 3GPP TSG-RAN WG1 Meeting #92b, pp. 1-5 (Year: 2018).*

The second Office Action of corresponding Chinese application No. 201880003183.9, dated Mar. 27, 2020.

The partial supplementary European search report of corresponding European application No. 18917776.9, dated Jul. 7, 2020.

Ericsson:"RAN1 decisions for WI Shortened TTI and processing time for LTE (LTE_sTTIandPT)—per topic", 3GPP Draft; R1-1731313, RAN1 Decisions for LTE_STTIANDPT—Per Topic (Revision of R1-1719247), 3rd Generation Partnership Project (3GPP), Mobile Competence Centre; 650, Route Des Lucioles; F-06921 S, vol. RAN WG1, no. Reno, USA; Nov. 27, 2018-Dec. 1, 2018 Dec. 4, 2017(12017-Dec. 4), XP051370717.

Ericsson:"RAN1 decisions for WI Shortened TTI and processing time for LTE (LTE_sTTIandPT)", 3GPP Draft: R1-1803173, RAN1 Decisions for LTE_STTIANDPT(Revision of R1-1721312), 3rd Generation Partnership Project (3GPP), Mobile Competence Centre; 650, Route Des Lucioles; F-06921 Sophia-Antipo, vol. RAN WG1, no. Athens, Greece; Feb. 26, 2018-Mar. 2, 2018 Mar. 6, 2018(Mar. 6, 2018), XP051412725.

The EESR of corresponding European application No. 18917776.9, dated Oct. 9, 2020.

The first OA and search report ofthe parallel CN application dated Jan. 20, 2020.

3GPP TSG RAN WG1 Meeting #92, R1-1803174 "Ran1 decisions for WI Shortened TTI and processing time for LTE (LTE sTTIandPT)—per topic", Ericsson, Mar. 6, 2018.

Ericsson R1-1803174, RAN1 decisions for WI Shortened TTI and processing time for LTE (LTE_sTTIandPT)—per topic 3GPP TSG RAN WG1 Meeting #92 Mar. 2, 2018.

International Search Report in the international application No. PCT/CN2018/086611, dated Feb. 1, 2019.

Written Opinion of the International Search Authority in the international application No. PCT/CN2018/086611, dated Feb. 1, 2019 with English translation provided by Google Translate.

The first Office Action of corresponding Russian application No. 2020140775, dated Aug. 27, 2021.

The first Office Action of corresponding Canada application No. 3099869, dated Nov. 10, 2021.

The first Office Action of corresponding Indian application No. 202017053771, dated Dec. 22, 2021.

The first Office Action of corresponding Japanese application No. 2020-563755, dated Mar. 1, 2022.

Huawei, HiSilicon,Remaining issues on SPS, 3GPP TSG RAN WG1 #92 R1-1801887, 3GPP, Feb. 16, 2018.

Huawei, HiSilicon, PUSCH design for LTE URLLC, 3GPP TSG RAN WG1 #92 R1-1801387, 3GPP, Feb. 16, 2018.

Ericsson, LG Electronics, Missing agreements from agreed text proposals at RAN1#92, 3GPP TSG RAN WG1 #92b R1-1805146, 3GPP, Apr. 6, 2018.

The first office action of the parallel SG application No. 11202011215W dated Aug. 2, 2022.

* cited by examiner

METHOD FOR TRANSMITTING UPLINK
SIGNAL AND TERMINAL DEVICE

CROSS-REFERENCE TO RELATED
APPLICATIONS

This application is a continuation of International Application No. PCT/CN2018/086611 filed on May 11, 2018, the content of which is incorporated herein by reference in its entirety.

TECHNICAL FIELD

The embodiments of the present application relate to the field of communications, and more particularly, to a method for transmitting the uplink signal and terminal device.

BACKGROUND

In the prior art, in order to reduce the delay of signal transmission, the time unit (or transmission time interval) used for signal transmission may be less than 14 symbols, that is, the transmission time interval for signal transmission is a short transmission time interval (sTTI). The sTTI may be divided into a slot TTI (slot-TTI) and a sub-slot TTI according to the length of the transmission time unit. Where, the time length of the slot TTI includes 7 symbols, and the time length of the sub-slot TTI includes 2 symbols or 3 symbols. For the sub-slot TTI, the position of the reference signal used to demodulate the uplink data channel in each sub-slot TTI is indicated by the uplink grant information. There may be one or more symbols of the uplink channels of different lengths overlap during transmission, and therefore, on these overlapping symbols, when the total transmitting power used to transmit multiple uplink channels exceeds the maximum transmitting power of the terminal device, how the terminal device to perform the transmission of the uplink channel becomes an urgent problem to be solved.

SUMMARY

The embodiments of the present application provide a method for transmitting an uplink signal and terminal device, which may still achieve the efficient transmission of the uplink channel when the total transmitting power used to transmit different uplink channels within the same time period exceeds the maximum transmitting power of the terminal device.

In a first aspect, a method for transmitting an uplink signal is provided, where the method includes: receiving, by a terminal device, uplink grant information transmitted by a network device, where the uplink grant information is used to instruct the terminal device to transmit a first uplink channel in a first sub-slot and to transmit a second uplink channel in a second sub-slot, where the first uplink channel includes first uplink data and does not include a reference signal, the second uplink channel includes a first reference signal and does not include uplink data, the first sub-slot and the second sub-slot are adjacent sub-slot on a first carrier, the first sub-slot is located previous to the second sub-slot, and the first reference signal is used to demodulate the first uplink data; determining, by the terminal device, whether to transmit the first uplink channel in the first sub-slot according to a priority of an uplink channel.

Where the priority of the uplink channel from low to high includes: an uplink channel without Hybrid Automatic Repeat request-Acknowledgement (HARQ-ACK) on a subframe; an uplink channel without HARQ-ACK in a slot; an uplink channel without HARQ-ACK without reference signal in a sub-slot; an uplink channel without HARQ-ACK with reference signal in a sub-slot; an uplink channel with HARQ-ACK on a subframe; an uplink channel with HARQ-ACK in a slot; and an uplink channel with HARQ-ACK in a sub-slot.

Therefore, in the embodiments of the present application, when the total transmitting power used to transmit different uplink channels within the same time period exceeds the maximum transmitting power of the terminal device, the terminal device performs the transmission of the uplink channel within the time period based on the priority of the uplink channel. Since the priority of the uplink channel without HARQ-ACK is lower than the priority of the uplink channel with HARQ-ACK, thereby the important HARQ-ACK is preferentially ensured to be normally transmitted; then, since the shorter the length of the TTI used to transmit the uplink channel is, the higher the priority of the transmitted uplink channel becomes, so the more urgent uplink channel may be ensured to be preferentially transmitted.

With reference to the first aspect, in a possible implementation form of the first aspect, if the first uplink channel does not include the HARQ-ACK, a priority of the first uplink channel is equal to the priority of the uplink channel without HARQ-ACK with reference signal in the sub-slot, or is equal to the priority of the uplink channel without HARQ-ACK without reference signal in the sub-slot.

With reference to the first aspect or any one of the foregoing possible implementation forms, in another possible implementation form of the first aspect, if the terminal device determines, according to the priority of the uplink channel, to transmit the first uplink channel in the first sub-slot, the method further including: determining, by the terminal device, whether to transmit the second uplink channel in the second sub-slot according to the priority of the uplink channel, where if the first uplink channel includes the HARQ-ACK, a priority of the second uplink channel is equal to the priority of the uplink channel with HARQ-ACK in the sub-slot.

With reference to the first aspect or any one of the foregoing possible implementation forms, in another possible implementation form of the first aspect, if the terminal device determines, according to the priority of the uplink channel, to transmit the first uplink channel in the first sub-slot, the method further including: determining, by the terminal device, whether to transmit the second uplink channel in the second sub-slot according to the priority of the uplink channel.

Where if the first uplink channel does not include the HARQ-ACK, the priority of the second uplink channel is equal to the priority of the uplink channel without HARQ-ACK with reference signal in the sub-slot; or, the priority of the second uplink channel is between the priority of the uplink channel without HARQ-ACK without reference signal in the sub-slot and the priority of the uplink channel without HARQ-ACK with reference signal in the sub-slot.

With reference to the first aspect or any one of the foregoing possible implementation forms, in another possible implementation form of the first aspect, if the terminal device determines, according to the priority of the uplink channel, to transmit the first uplink channel in the first sub-slot, the method further including: determining, by the terminal device, whether to transmit the second uplink channel in the second sub-slot according to the priority of the uplink channel.

Where the priority of the second uplink channel is equal to the priority of the uplink channel without HARQ-ACK with reference signal in the sub-slot; or, the priority of the second uplink channel is between the priority of the uplink channel without HARQ-ACK without reference signal in the sub-slot and the priority of the uplink channel without HARQ-ACK with reference signal in the sub-slot.

With reference to the first aspect or any one of the foregoing possible implementation forms, in another possible implementation form of the first aspect, if the terminal device determines, according to the priority of the uplink channel, not to transmit the first uplink channel in the first sub-slot, the method further including: determining, by the terminal device, not to transmit the second uplink channel in the second sub-slot.

With reference to the first aspect or any one of the foregoing possible implementation forms, in another possible implementation form of the first aspect, if the terminal device determines, according to the priority of the uplink channel, not to transmit the first uplink channel in the first sub-slot, the method further including: determining, by the terminal device, whether to transmit the second uplink channel in the second sub-slot according to the priority of the uplink channel, where the priority of the second uplink channel is the lowest.

With reference to the first aspect or any one of the foregoing possible implementation forms, in another possible implementation form of the first aspect, in the case that whether the uplink channel includes the HARQ-ACK and whether the uplink channel includes the reference signal has same situation, a priority of an uplink channel transmitted on a second carrier is lower than a priority of an uplink channel transmitted on the first carrier. Where the first carrier is a carrier in a primary physical uplink control channel (PUCCH) group configured for the terminal device, and the second carrier is a carrier in a secondary PUCCH group configured for the terminal device.

With reference to the first aspect or any one of the foregoing possible implementation forms, in another possible implementation form of the first aspect, the terminal device has a capability of uplink channel concurrent transmission for different time lengths, and is configured to be able to perform the uplink channel concurrent transmission for different time lengths.

In a second aspect, a method for transmitting an uplink signal is provided, where the method includes: receiving, by a terminal device, uplink grant information transmitted by a network device, where the uplink grant information is used to instruct the terminal device to transmit first uplink data in a first sub-slot, and transmit a first reference signal in a second sub-slot and not transmit the uplink data, where the first sub-slot and the second sub-slot are adjacent sub-slot, the first sub-slot is located previous to the second sub-slot, the first reference signal is used to demodulate the first uplink data, the second sub-slot is further used to transmit a first physical uplink control channel (PUCCH), and the first PUCCH includes first uplink control information (UCI); transmitting, by the terminal device, one of the first reference signal and the first PUCCH in the second sub-slot according to information content included in a first Physical Uplink Shared Channel (PUSCH) used to transmit the first uplink data and/or the first UCI.

Therefore, in the embodiments of the present application, when the total transmitting power used to transmit the reference signal and the PUCCH within the same time period exceeds the maximum transmitting power of the terminal device, the terminal device performs the transmission of the uplink channel within the time period based on the information content included in the PUSCH demodulated by the reference signal and the information content included in the PUCCH, so as to ensure that important uplink control information can be transmitted and demodulated.

With reference to the second aspect, in a possible implementation form of the second aspect, the first PUSCH does not include a UCI, or the first PUSCH includes a second UCI and the second UCI does not include Hybrid Automatic Repeat request-Acknowledgement (HARQ-ACK) information, and the transmitting, by the terminal device, one of the first reference signal and the first PUCCH in the second sub-slot, includes: transmitting, by the terminal device, the first PUCCH in the second sub-slot.

With reference to the second aspect or any one of the foregoing possible implementation forms, in another possible implementation form of the second aspect, the first PUSCH includes a second UCI and the second UCI includes the HARQ-ACK information, and the transmitting, by the terminal device, one of the first reference signal and the first PUCCH in the second sub-slot, includes: transmitting, by the terminal device, the first reference signal in the second sub-slot.

With reference to the second aspect or any one of the foregoing possible implementation forms, in another possible implementation form of the second aspect, the first UCI includes the HARQ-ACK information, and the method further includes: transmitting, by the terminal device, the HARQ-ACK information in the first UCI in the first sub-slot.

With reference to the second aspect or any one of the foregoing possible implementation forms, in another possible implementation form of the second aspect, the first UCI includes the HARQ-ACK information, and the method further includes: transmitting, by the terminal device, the first PUCCH in the second sub-slot.

With reference to the second aspect or any one of the foregoing possible implementation forms, in another possible implementation form of the second aspect, the first UCI does not include the HARQ-ACK information, and the method further includes: transmitting, by the terminal device, the first reference signal in the second sub-slot if the first PUSCH includes a second UCI and the second UCI includes the HARQ-ACK information.

With reference to the second aspect or any one of the foregoing possible implementation forms, in another possible implementation form of the second aspect, the first UCI does not include the HARQ-ACK information, and the method further includes: transmitting, by the terminal device, the first PUCCH in the second sub-slot if the first PUSCH does not include the UCI, or the first PUSCH includes the second UCI and the second UCI does not include the HARQ-ACK information.

With reference to the second aspect or any one of the foregoing possible implementation forms, in another possible implementation form of the second aspect, the terminal device does not have a capability of uplink channel concurrent transmission; or the terminal device has a capability of uplink channel concurrent transmission but is configured to not perform the uplink channel concurrent transmission.

In a third aspect, a terminal device is provided, which may perform the method in the above first aspect or any optional implementation form of the first aspect. In particular, the terminal device may include functional modules for performing the method in the above first aspect or any optional implementation form of the first aspect.

In a fourth aspect, a terminal device is provided, which may perform the method in the above second aspect or any optional implementation form of the second aspect. In particular, the terminal device may include functional modules for performing the method in the above second aspect or any optional implementation form of the second aspect.

In a fifth aspect, a terminal device is provided, including a processor and a memory. The memory is used for storing a computer program, and the processor is used for calling and running the computer program stored in the memory, so as to perform the method in the above first aspect or any possible implementation form of the first aspect.

In a sixth aspect, a terminal device is provided, including a processor and a memory. The memory is used for storing a computer program, and the processor is used for calling and running the computer program stored in the memory, so as to perform the method in the above second aspect or any possible implementation form of the second aspect.

In a seventh aspect, a chip is provided for implementing the method in the above first aspect or any possible implementation form of the first aspect.

Specifically, the chip includes a processor for calling and running a computer program from a memory, such that the device on which the chip is mounted performs the method in the above first aspect or any possible implementation form of the first aspect.

In an eighth aspect, a chip is provided for implementing the method in the above second aspect or any possible implementation form of the second aspect.

Specifically, the chip includes a processor for calling and running a computer program from a memory, such that the device on which the chip is mounted performs the method in the above second aspect or any possible implementation form of the second aspect.

In a ninth aspect, a computer readable storage medium is provided for storing a computer program that causes a computer to perform the method in the above first aspect or any possible implementation form of the first aspect.

In a tenth aspect, a computer readable storage medium is provided for storing a computer program that causes a computer to perform the method in the above second aspect or any possible implementation form of the second aspect.

In an eleventh aspect, a computer program product is provided, including computer program instructions that cause a computer to perform the method in the above first aspect or any possible implementation form of the first aspect.

In a twelfth aspect, a computer program product is provided, including computer program instructions that cause a computer to perform the method in the above second aspect or any possible implementation form of the second aspect.

In a thirteenth aspect, a computer program is provided that when executed on a computer, causes the computer to perform the method in the above first aspect or any possible implementation form of the first aspect.

In a fourteenth aspect, a computer program is provided that when executed on a computer, causes the computer to perform the method in the above second aspect or any possible implementation form of the second aspect.

DESCRIPTION OF EMBODIMENTS

The technical solutions of the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), a Wireless Fidelity (Wi-Fi), a next-generation communication systems, or other communication systems, and the like.

In general, the number of connections supported by a traditional communication system is limited, and it is also easy to implement. However, with the development of communication technologies, the mobile communication system will not only support traditional communication, but also support, for example, Device to Device (D2D) communication, Machine to Machine (M2M) communication, Machine Type Communication (MTC), and Vehicle to Vehicle (V2V) communication, etc., and embodiments of the present application may also be applied to these communication systems.

The communication system in the embodiments of the present application may be applied to a Carrier Aggregation (CA) scenario, or may be applied to a Dual Connectivity (DC) scenario, and may also be applied to a Standalone (SA) network construction scenario.

The applied spectrum will not be limited in the embodiments of the present application. For example, the embodiments of the present application may be applied to a licensed spectrum, and may also be applied to an unlicensed spectrum.

Figure 1:
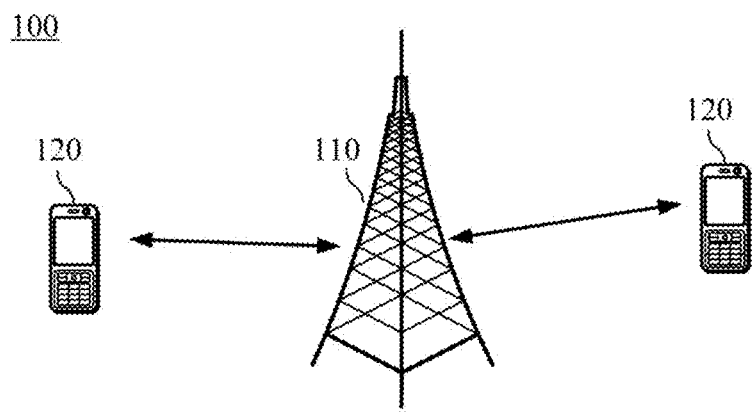
FIG. 1 is a schematic diagram of a possible wireless communication system applied in an embodiment of the present application.

FIG. 1 illustrates a possible wireless communication system 100 applied in the embodiments of the present application. The wireless communication system 100 may include a network device 110. The Network device 110 may be a device communicating with a terminal device. The network device 110 may provide communication coverage for a particular geographic area and may communicate with the terminal devices located within the coverage area. In an embodiment, the network device 100 may be a Base Transceiver Station (BTS) in a GSM system or a CDMA system, or may be a NodeB (NB) in a WCDMA system, or may also be an Evolutional Node B (eNB or eNodeB) in an LTE system, or a network side device in the NR system, or a wireless controller in a Cloud Radio Access Network (CRAN), or the network device may be a relay station, an access point, a vehicle-mounted device, a wearable device, a network-side device in the next-generation network, or the network device in the future evolutional Public Land Mobile Network (PLMN), and the like.

The wireless communication system 100 also includes at least one terminal device 120 located within the coverage of the network device 110. The terminal device 120 may be mobile or fixed. In an embodiment, the terminal device 120 may refer to an access terminal, user equipment (UE), a subscriber unit, a subscriber station, a mobile station, a mobile platform, a remote station, a remote terminal, a mobile device, a user terminal, a terminal, and a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to the wireless modems, a vehicle-mounted device, a wearable device, a terminal devices in the future 5G network, or a terminal device in the future evolutional PLMN, etc. Where, in an embodiment, Device to Device (D2D) communication may be implemented among terminal devices 120.

Specifically, the network device 110 may provide a service for the cell, and the terminal device 120 communicates with the network device 110 by using a transmission resource (for example, a frequency domain resource, or a spectrum resource) used by the cell, the cell may be the cell corresponding to the network device 110 (For example, a base station), the cell may belong to a macro base station, or may belong to a base station corresponding to a small cell, and the small cell may include: a metro cell, a micro cell, a pico cell, or a Femto cell, etc. These small cells have features of small coverage and low transmitting power, which are suitable for providing high-speed data transmission services.

FIG. 1 illustratively shows one network device and two terminal devices. In an embodiment, the wireless communication system 100 may include a plurality of network devices, and other numbers of terminal devices may be included within the coverage of each network device, which is not limited in the embodiments of the present application.

In an embodiment, the wireless communication system 100 may further include other network entities, such as a network controller and a mobility management entity, etc., which is not limited in the embodiments of the present application.

It should be understood that the uplink channel may include a Physical Random Access Channel (PRACH), a Physical Uplink Control Channel (PUCCH), a Physical Uplink Shared Channel (PUSCH), etc. The uplink reference signal may include a DeModulation Reference Signal (DMRS), a Sounding Reference Signal (SRS), a Phase Tracking Reference Signal (PT-RS), etc. Where the uplink DMRS may be used for demodulation of the uplink channel, the SRS may be used for uplink channel measurement, uplink time-frequency synchronization or phase tracking, and the PT-RS may also be used for the uplink channel measurement, uplink time-frequency synchronization or phase tracking.

It should also be understood that the uplink channel may also include a physical channel or reference signal with the same name and different functions as mentioned above, and may also include the physical channel or the reference signal with the different names and the same function as mentioned above.

It should also be understood that the transmission object of the embodiments of the present application may be an uplink channel, and specifically, may be a PUSCH and/or a PUCCH. After the sTTI transmission technology is introduced, the scheduling unit for scheduling signal transmission in the radio link may be a subframe TTI (i.e., a subframe-TTI, for example, the length of the TTI length is 14 symbols), a slot TTI (i.e., a slot-TTI, for example, the length of the TTI length is 7 symbols) or a sub-slot TTI (i.e., a subslot-TTI, for example, the length of the TTI length is 2 symbols or 3 symbols). That is, the PUSCH and/or PUCCH may be transmitted in the subframe TTI, or in the slot TTI, or in the sub-slot TTI.

Figure 2:
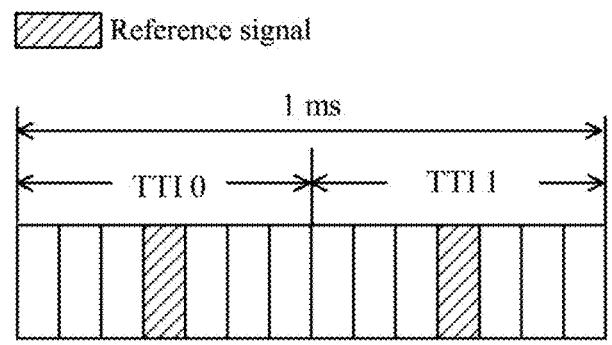
FIG. 2(a) is a schematic diagram of a slot TTI.
FIG. 2(b) is a schematic diagram of a sub-slot TTI.
Figure 2:
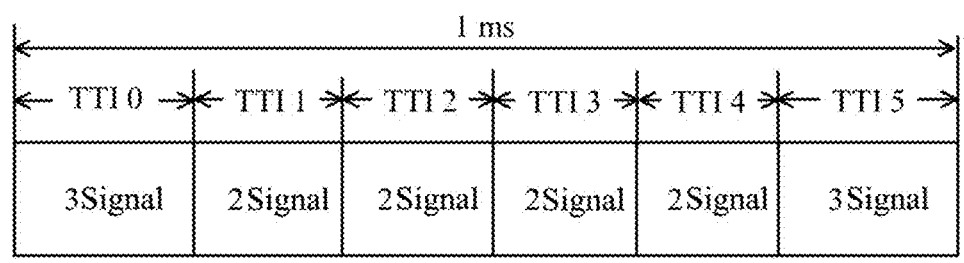

As an example rather than limitation, the structure of a slot TTI is shown as FIG. 2(*a*), 1 millisecond includes 14 symbols, wherein the first 7 symbols form a slot TTI, and the left 7 symbols form a slot TTI, and for each of the slot TTIs, the reference signal is located at the 4th symbol of a slot.

As an example rather than limitation, the structure of a sub-slot TTI is shown as FIG. 2(*b*), and 14 symbols included in 1 millisecond are divided into 6 sub-slot TTIs, where each of the first and last sub-slot TTIs includes 3 symbols, and each of the left 4 sub-slot TTIs includes 2 symbols. In the structure of the sub-slot TTI, the position of the reference signal used to demodulate the uplink channel transmitted in each sub-slot TTI may be indicated by dynamic signaling, such as uplink grant information.

Table 1 gives an example to dynamically indicate the position of the reference signal used to demodulate a sub-slot TTI. As shown in Table 1, D denotes a symbol for transmitting the uplink data, R denotes a symbol for transmitting a reference signal, and the terminal device performs transmission of the uplink data symbol and the reference signal symbol according to the dynamic signaling indication transmitted by the network device. Specifically, sTTI 0 includes 3 symbols, and the reference signal used to demodulate the PUSCH in the sTTI 0 may be located at the first symbol or the last symbol in the sTTI 0; sTTI 1 includes 2 symbols, the reference signal used to demodulate the PUSCH in the sTTI 1 may be located at the first symbol or the last symbol in the sTTI 1, or may not be located in the sTTI 1, for example, when dynamic signaling indicates that "DD" is transmitted in the sTTI 1, the reference signal used to demodulate the PUSCH in the sTTI 1 may be located in the sTTI 0; when the dynamic signaling indicates that "DD|R" is transmitted in the sTTI 1, the reference signal used to demodulate the PUSCH demodulation in the sTTI 1 is located at the first symbol in the sTTI 2; the sTTI 2 includes 2 symbols, the reference signal used to demodulate the PUSCH in the sTTI 2 may be located at the first symbol in the sTTI 2, or may not be located in the sTTI 2, for example, when dynamic signaling indicates that "DD" is transmitted in the sTTI 2, the reference signal used to demodulate the PUSCH in the sTTI 2 may be located in the sTTI 0 or sTTI 1; the sTTI 3 includes 2 symbols, and the reference signal used to demodulate the PUSCH in the sTTI 3 may be located at the first symbol or the last symbol in the sTTI 3, or may also be located at the first symbol in the sTTI 4; the sTTI 4 includes 2 symbols, and the reference signal used to demodulate the PUSCH in the sTTI 4 may be located at the first symbol or the last symbol in the sTTI 4, or may not be located in the sTTI 4, for example, when dynamic signaling indicates that "DD" is transmitted in the sTTI 4, the reference signal used to demodulate the PUSCH in the sTTI 4 may be located in the sTTI 3; when the dynamic signaling indicates that "DD|R" is transmitted in the sTTI 4, the reference signal used to demodulate the PUSCH in the sTTI 4 is located at the first symbol in the sTTI 5; the sTTI 5 includes 3 symbols, and the reference signal used to demodulate the PUSCH in the sTTI 5 may be located at the first symbol of the sTTI 5.

TABLE 1

| Position of reference signal | | | | | |
| --- | --- | --- | --- | --- | --- |
| sTTI 0 | sTTI 1 | sTTI 2 | sTTI 3 | sTTI 4 | sTTI 5 |
| RDD | RD | RD | RD | RD | RDD |
| DDR | DR | DD | DR | DR | |
| | DD | | DD|R | DD | |
| | DD|R | | | DD|R | |

It should be noted that data symbols included in the PUSCH may carry Uplink Control Information (UCI) or may not carry the UCI. The UCI carried in the PUSCH may include at least one of the HARQ-ACK and Channel State Information (CSI), where the CSI includes at least one of a Rank Indication (RI), a Precoding Matrix Indicator (PMI) and a Channel Quality Indicator (CQI).

When the terminal device is configured with at least two carriers available for uplink channel transmission, there may be one or more symbols overlap in the time domain for the uplink channel transmitted by the terminal device on the at least two carriers, where the TTI lengths of the uplink channel on the at least two carriers may be the same or be different. Therefore, on these overlapping symbols, the terminal device is required to determine how to perform the transmission of the uplink channels on different carriers when the total transmitting power for transmitting a plurality of uplink channels exceeds the maximum transmitting power of the terminal device. For example, if the terminal device is dynamically scheduled to use "DD|R" for performing the transmission of the uplink data in the sTTI n, and it is not scheduled to perform the transmission of the uplink data in the sTTI n+1, the terminal device should transmit "DD" in the sTTI n and transmit "R" in the sTTI n+1. In case of in the same sTTI n or sTTI n+1, the terminal device should also transmit other uplink channels with its transmitting power being limited (for example, the total transmitting power of the terminal device for transmitting one or more uplink channels exceeds the maximum transmitting power of the terminal device), and then the terminal device is required to determine whether to transmit the uplink data in the sTTI n and whether to transmit the reference signal used to demodulate the uplink data in the sTTI n+1.

Therefore, the embodiment of the present application proposes that when there are at least two uplink channels overlap in the time domain and the total transmitting power for transmitting different uplink channels exceeds the maximum transmitting power of the terminal device, the terminal device performs transmission of the uplink channel based on the priority of the uplink channel.

In the embodiments of the present application, referring to Table 1, the PUSCH transmitted in the sub-slot TTI may include the following three cases:

Case 1: the data symbol and the reference signal symbol are included in the PUSCH. For example, when the terminal device is scheduled to transmit "RDD", "DDR", "RD", or "DR";

Case 2: the data symbol is included and the reference signal symbol is not included in the PUSCH. For example, when the terminal device is scheduled to transmit "DD", or when the terminal device is scheduled to transmit "DD|R" in the sTTI n, the terminal device should transmit "DD" in the sTTI n and transmit "R" in the sTTI n+1, where the transmission in the sTTI n also belongs to this case;

Case 3: the reference signal symbol is included and the data symbol is not included in the PUSCH. For example, when the terminal device is scheduled to transmit "DD|R" in the sTTI n, the terminal device should transmit "DD" in the sTTI n and transmit "R" in the sTTI n+1, where the transmission in the sTTI n+1 belongs to this case.

It should be noted that if the terminal device is scheduled to transmit "DD|R" in the sTTI n and is scheduled to transmit "RD" in the sTTI n+1, and the frequency resource occupied by the uplink channel in the sTTI n+1 includes the frequency resource occupied by the uplink channel in the sTTI n, the terminal device should transmit "DD" in the sTTI n and should transmit "RD" in the sTTI n+1. In this case, the transmission in the sTTI n+1 belongs to the Case 1 described above.

Figure 3:
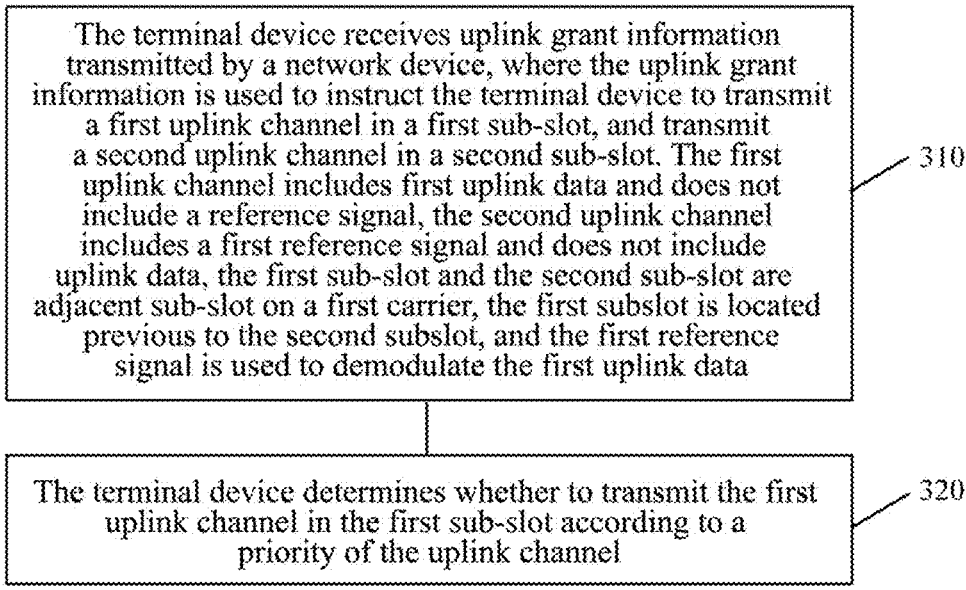
FIG. 3 is a schematic flowchart of a method for transmitting an uplink signal according to an embodiment of the present application.

FIG. 3 is a schematic flowchart of a method 300 for transmitting an uplink signal according to an embodiment of the present application. The method described in FIG. 3 may be performed by a terminal device, which may be, for example, a terminal device 120 shown in FIG. 1. As shown in FIG. 3, the method 300 for transmitting the uplink signal may include some or all of the following steps. Where:

In 310, receiving, by a terminal device, uplink grant information transmitted by a network device, where the uplink grant information is used to instruct the terminal device to transmit a first uplink channel in a first sub-slot, and transmit a second uplink channel in a second sub-slot.

Where the first uplink channel includes first uplink data and does not include a reference signal, the second uplink channel includes the first reference signal and does not include uplink data, the first sub-slot and the second sub-slot are adjacent sub-slot on a first carrier, the first subslot is located previous to the second subslot, and the first reference signal is used to demodulate the first uplink data.

In the embodiments of the present application, the first uplink channel is the Case 2 described above, and the second uplink channel is the Case 3 described above.

It should be understood that the uplink grant information may be one or more uplink grant information. The terminal device may receive one or more uplink grant information, where a piece of uplink grant information may schedule one or more uplink channels, which will not be limited in the present application.

In 320, determining, by the terminal device, whether to transmit the first uplink channel in the first sub-slot according to a priority of the uplink channel.

Where the priority of the uplink channel from low to high includes:

an uplink channel without Hybrid Automatic Repeat request-Acknowledgement (HARQ-ACK) on a subframe;

an uplink channel without HARQ-ACK in a slot;

an uplink channel without HARQ-ACK without reference signal in a sub-slot;

an uplink channel without HARQ-ACK with reference signal in a sub-slot;

an uplink channel with HARQ-ACK on a subframe;

an uplink channel with HARQ-ACK in a slot;

an uplink channel with HARQ-ACK in a sub-slot.

In an embodiment, the HARQ-ACK information is the feedback of the corresponding ACK or NACK performed by the terminal device on the received downlink channel. Therefore, it may be considered that the HARQ-ACK information in the UCI has the highest priority when the UCI is transmitted on the PUSCH.

In the embodiments of the present application, the subslot may include 2 symbols or 3 symbols, the slot includes 7 symbols, and the subframe includes 14 symbols. In the priority order of the uplink channel, the uplink channel in the sub-slot is the uplink channel transmitted in the sTTI (i.e., subslot-TTI) including 2 symbols or 3 symbols, the uplink channel in the slot is the uplink channel transmitted in the sTTI (i.e., slot-TTI) including 7 symbols, and the uplink channel on the subframe is the uplink channel transmitted in the TTI including 14 symbols.

Where the uplink channel in the sub-slot may include only the uplink data or only the reference signal, or include both the uplink data and the reference signal.

In an embodiment, the terminal device receives the uplink grant information, where the uplink grant information instructs the terminal device to transmit the first uplink channel in the first sub-slot and transmit the second uplink channel in the second sub-slot. The first uplink channel includes the first uplink data and does not include the reference signal, the second uplink channel includes the first reference signal used to demodulate the first uplink data and does not include the uplink data. It may be understood that the terminal device is scheduled to transmit the DD|R in the first sub-slot and R thereof is transmitted in the second sub-slot, and the transmission of the uplink data of the terminal device is not scheduled in the second sub-slot. If the terminal device further determines to transmit other uplink channels in the first sub-slot and the transmitting power of the terminal device is limited, the terminal device may determine, according to the priority of the uplink channel, whether to transmit the first uplink channel in the first sub-slot.

In the priority information of the uplink channel, whether the uplink channel includes the HARQ-ACK information should be considered first, including that the priority of the uplink channel with HARQ-ACK is higher than the priority of the uplink channel without HARQ-ACK; then the length of the uplink channel is considered, where the priority of the uplink channel in the sub-slot is higher than the priority of the uplink channel in the slot, and the priority of the uplink channel in the slot is higher than the priority of the uplink channel on the subframe.

Therefore, when the total transmitting power used to transmit different uplink channels within the same time period exceeds the maximum transmitting power of the terminal device, the terminal device performs the transmission of the uplink channel based on the priority of the uplink channel. Since the priority of the uplink channel without HARQ-ACK is lower than the priority of the uplink channel with HARQ-ACK, the important HARQ-ACK is preferentially ensured to be normally transmitted; then, since the shorter the length of the TTI used to transmit the uplink channel is, the higher the priority of the transmitted uplink channel becomes, so the more urgent uplink channel may be ensured to be preferentially transmitted.

In this embodiment, the terminal device has a capability of uplink channel concurrent transmission for different time lengths, and is configured to be able to perform the uplink channel concurrent transmission for different time lengths.

It should be understood that the TTI lengths of the collided uplink channels may be different or may be the same.

In an embodiment, if collision between the uplink channel in the long TTI and the uplink channel in the short TTI has occurred, and the collision between the uplink channel in the long TTI and the uplink channel in the short TTI occurs again afterwards, the uplink channel in the long TTI is continued to be transmitted without considering the priority. For example, the uplink channel in the sub-slot collides with the uplink channel on the subframe in one certain sTTI, it is assumed that the transmitting power of the terminal device is limited and the terminal device selects to transmit the uplink channel on the subframe according to the priority, then if, after the sTTI, the uplink channel on the subframe collides with the uplink channel in other short TTI again, the uplink channel on the subframe is continued to be transmitted without considering the priority.

In an embodiment, if the uplink channel in the long TTI has collided with the uplink channel in the short TTI and the long TTI is determined not to be transmitted, it is assumed that the uplink channel in the long TTI is then not collided with the uplink channel in the short TTI, that is, the priority of the uplink channel in the long TTI is no longer considered in the subsequent short TTI overlapping with the long TTI. For example, the uplink channel in the sub-slot and the uplink channel on the subframe collide on a certain sTTI, assuming that the transmitting power of the terminal device is limited and the terminal device selects, according to the priority, to transmit the uplink channel in the sub-slot and does not transmit the uplink channel on the subframe, and then assuming that the uplink channel on the subframe will not be transmitted after the sTTI, that is, the uplink channel on the subframe does not interfere with the uplink transmission in the sTTI after the sTTI.

It should be understood that collision between the long TTI and the short TTI may refer to the collision between the uplink channel in the sub-slot and the uplink channel in the slot, or refer to the collision between the uplink channel in the sub-slot and the uplink channel on the subframe, or refer to the collision between the uplink channel in the slot and the uplink channel on the subframe.

In an embodiment, if the first uplink channel does not include the HARQ-ACK, a priority of the first uplink channel is equal to the priority of the uplink channel without HARQ-ACK with reference signal in the sub-slot, or is equal to the priority of the uplink channel without HARQ-ACK without reference signal in the sub-slot.

In 320, if determining, by the terminal device, not to transmit the first uplink channel in the first sub-slot according to the priority of the uplink channel, the method may further include: determining, by the terminal device, not to transmit the second uplink channel in the second subslot according to the priority of the uplink channel.

Since the terminal device does not transmit, in the first sub-slot, the first uplink channel used to transmit the first uplink data and the first reference signal in the second slot is used to demodulate the first uplink channel, the terminal device does not transmit, in the second sub-slot, the second uplink channel used to transmit the first reference signal when the first uplink channel is not transmitted.

Or, in 320, if the terminal device determining, according to the priority of the uplink channel, not to transmit the first uplink channel in the first sub-slot, the method further includes: determining, by the terminal device, whether to transmit the second uplink channel in the second sub-slot according to the priority of the uplink channel, where the second uplink channel has the lowest priority.

When the terminal device does not transmit, in the first sub-slot, the first uplink channel used to transmit the first uplink data, if the first reference signal is not transmitted in the second slot, it may lead to the waste of the resource in the second slot. Therefore, in this embodiment, the priority of the second uplink channel used to transmit the first reference signal is ranked to be the lowest, such that when the second uplink channel collides with other uplink channels in the second slot and the transmitting power of the terminal device is limited, other useful uplink channels may be preferentially ensured to be transmitted; in addition, when the second uplink channel does not collide with other channels in the second slot, the second uplink channel may be transmitted, at that time, the first reference signal in the second uplink channel may be used to assist the network device to perform uplink channel measurement, uplink synchronization, etc.

In 320, if determining, by the terminal device, to transmit the first uplink channel in the first sub-slot according to the priority of the uplink channel, the method may further include: determining, by the terminal device, whether to transmit the second uplink channel in the second sub-slot according to the priority of the uplink channel.

Specifically, if the terminal device determines to transmit the first uplink channel in the first sub-slot, the terminal device is required to determine whether to transmit the second uplink channel in the second sub-slot because the reference signal used to demodulate the first uplink data is transmitted in the second sub-slot. The terminal device may be based on the information of the priority of the uplink channel described above to determine whether to transmit the second uplink channel in the second sub-slot or not.

In the embodiments of the present application, the terminal device may determine the priority of the second uplink channel by the following four modes.

Mode 1

If the first uplink channel includes the HARQ-ACK, the priority of the second uplink channel is equal to the priority of the uplink channel with HARQ-ACK in the sub-slot.

If the first uplink channel does not include the HARQ-ACK, the priority of the second uplink channel is equal to the priority of the uplink channel without HARQ-ACK with reference signal in the sub-slot.

Mode 2

If the first uplink channel includes the HARQ-ACK, the priority of the second uplink channel is equal to the priority of the uplink channel with HARQ-ACK in the sub-slot.

If the first uplink channel does not include the HARQ-ACK, the priority of the second uplink channel is between the priority of the uplink channel without HARQ-ACK without reference signal in the sub-slot and the priority of the uplink channel without HARQ-ACK with reference signal in the sub-slot.

Mode 3

The priority of the second uplink channel is equal to the priority of the uplink channel without HARQ-ACK with reference signal in the sub-slot.

Mode 4

The priority of the second uplink channel is between the priority of the uplink channel without HARQ-ACK without reference signal in the sub-slot and the priority of the uplink channel without HARQ-ACK with reference signal in the sub-slot.

In an embodiment, in the case that whether the uplink channel includes the HARQ-ACK and whether the uplink channel includes the reference signal has same situation, a priority of an uplink channel transmitted on a second carrier is lower than a priority of an uplink channel transmitted on the first carrier.

Where the first carrier is a carrier in a primary physical uplink control channel (PUCCH) group configured for the terminal device, and the second carrier is a carrier in a secondary PUCCH group configured for the terminal device.

At this time, the priority of the uplink channel described above from low to high may include:

an uplink channel without HARQ-ACK on a subframe on a second carrier;

an uplink channel without HARQ-ACK on a subframe on a first carrier;

an uplink channel without HARQ-ACK in a slot on a second carrier;

an uplink channel without HARQ-ACK in a slot on a first carrier;

an uplink channel without HARQ-ACK without reference signal in a sub-slot on a second carrier;

an uplink channel without HARQ-ACK without reference signal in a sub-slot on a first carrier;

an uplink channel without HARQ-ACK with reference signal in a sub-slot of a second carrier;

an uplink channel without HARQ-ACK with reference signal in a sub-slot on a first carrier;

an uplink channel with HARQ-ACK on a subframe on a second carrier;

an uplink channel with HARQ-ACK on a subframe on a first carrier;

an uplink channel with HARQ-ACK in a slot on a second carrier;

an uplink channel with HARQ-ACK in a slot on a first carrier;

an uplink channel with HARQ-ACK in a sub-slot of a second carrier;

an uplink channel with HARQ-ACK in a sub-slot of a first carrier.

Correspondingly, the PUCCH group to which the first uplink channel belongs should also be considered when the terminal device determines the priority of the first uplink channel. Similarly, the PUCCH group to which the second uplink channel belongs should also be considered when the terminal device determines the priority of the second uplink channel.

Taking the first uplink channel as an example, if the first uplink channel collides with another uplink channel (assumed to be the third uplink channel) in the first sub-slot and the third uplink channel belongs to the same PUCCH group as the first uplink channel, that is, the third uplink channel and the first uplink channel are both transmitted on the carrier in the same PUCCH group, and the length of the third uplink channel is different from the length of the first uplink channel, then, the uplink channel with a longer length is not transmitted, and if the uplink channel with the longer length carries the HARQ-ACK, the HARQ-ACK may be transmitted on the uplink channel with a shorter length.

If the first uplink channel collides with the third uplink channel in the first sub-slot, the third uplink channel belongs to the same PUCCH group as the first uplink channel, and the length of the third uplink channel is the same as the length of the first uplink channel, then which of the uplink channel to be transmitted in the first sub-slot may be determined according to the priority described above. In this case, if the case of carrying the reference signal and the HARQ-ACK on the first uplink channel is the same as the case of carrying the reference signal and the HARQ-ACK on the third uplink channel, the priorities of both the first uplink channel and the third uplink channel may be determined according to their corresponding cell indexes (identifications). For example, the first uplink channel is transmitted on the carrier 1 in the primary PUCCH group, the third uplink channel is transmitted on the carrier 2 in the primary PUCCH group, and the cell index corresponding to the carrier 1 is less than the cell index corresponding to the carrier 2, then the priority of the first uplink channel is higher than the priority of the third uplink channel. If the first uplink channel collides with the third uplink channel in the first sub-slot, the third uplink channel and the first uplink channel belong to different PUCCH groups, and the length of the third uplink channel is the same as or different from the length of the first uplink channel, then which of the uplink channel to be transmitted in the first sub-slot may be determined according to the priority described above.

The following is described by way of example with reference to Table 2 to Table 6. It is assumed that the first carrier in the primary PUCCH group is scheduled DD|R in the sTTI n, where the uplink data DD is transmitted in the sTTI n and the reference signal R used to demodulate DD is transmitted in the sTTI n+1. When the transmitting power of the terminal device is limited, the transmission situation of the uplink channel may be shown as follows, where the uplink channel that is crossed off by "—" indicates an uplink channel with a low priority, that is, the uplink channel crossed off by the "—" is not transmitted or is transmitted with a reduced power transmission, where "w/" denotes with, and "w/o" denotes without. Correspondingly, "w/HARQ-ACK" denotes the uplink channel carries the HARQ-ACK, and "w/o HARQ-ACK" denotes that the uplink channel does not carry the HARQ-ACK.

In Table 2, in the sTTI n, the priority of the PUSCH w/HARQ-ACK on the carrier in the primary PUCCH group is higher than the priority of the PUSCH on the carrier in the secondary PUCCH group. Therefore, the PUSCH in the sTTI n on the carrier in the secondary PUCCH group will not be transmitted.

On the sTTI n+1, it is assumed that the priority is determined using the foregoing mode 1 or mode 2, and the reference signal transmitted on the carrier in the primary PUCCH group is used to demodulate the PUSCH w/HARQ-ACK in the sTTI n. Therefore, the priority of the uplink channel used to transmit the reference signal on the carrier in the primary PUCCH group is higher than the priority of the PUSCH w/UCI transmitted on the carrier in the secondary PUCCH group, so the PUSCH w/HARQ-ACK in the sTTI n+1 on the carrier in the secondary PUCCH group will not be transmitted.

TABLE 2

| PUCCH Group | sTTI n | sTTI n + 1 |
| --- | --- | --- |
| A carrier in the primary PUCCH group | PUSCH w/ HARQ-ACK | Reference signal |
| A carrier in the secondary PUCCH group | ~~PUSCH~~ | ~~PUSCH w/HARQ-ACK~~ |

In Table 3, in the sTTI n, since the priority of the PUSCH w/o HARQ-ACK on the carrier in the primary PUCCH group is lower than the priority of the PUSCH w/HARQ-ACK on the carrier in the secondary PUCCH group, therefore the PUSCH w/o HARQ-ACK in the sTTI n on the carrier in the primary PUCCH group will not be transmitted.

In the sTTI n+1, since the PUSCH w/o HARQ-ACK in the sTTI n on the carrier in the primary PUCCH group is not transmitted and the PUSCH w/HARQ-ACK is in the secondary PUCCH group, therefore the priority of the uplink channel used to transmit the reference signal on the carrier in the primary PUCCH group is the lowest and thus will not be transmitted.

TABLE 3

| PUCCH Group | sTTI n | sTTI n + 1 |
| --- | --- | --- |
| A carrier in the primary PUCCH group | ~~PUSCH w/o HARQ-ACK~~ | ~~Reference signal~~ |
| A carrier in the secondary PUCCH group | PUSCH w/ HARQ-ACK | PUSCH w/ HARQ-ACK |

In Table 4, in the sTTI n, since the priority of the PUSCH w/o HARQ-ACK on the carrier in the primary PUCCH group is higher than the priority of the PUSCH w/o HARQ-ACK on the carrier in the secondary PUCCH group, therefore the PUSCH w/o HARQ-ACK in the sTTI n on the carrier in the secondary PUCCH group will not be transmitted.

In the sTTI n+1, since the PUSCH w/HARQ-ACK is transmitted on the carrier in the secondary PUCCH group and the priority of the uplink channel used to transmit the reference signal on the carrier in the primary PUCCH group is lower than the priority of the PUSCH w/HARQ-ACK transmitted in the sTTI n+1 on the carrier in the secondary PUCCH group, therefore the reference signal on the carrier in the primary PUCCH group will not be transmitted.

TABLE 4

| PUCCH Group | sTTI n | sTTI n + 1 |
| --- | --- | --- |
| A carrier in the primary PUCCH group | PUSCH w/o HARQ-ACK | ~~Reference signal~~ |
| A carrier in the secondary PUCCH group | ~~PUSCH w/o HARQ-ACK~~ | PUSCH w/ HARQ-ACK |

In Table 5, in the sTTI n, since the priority of the PUSCH w/o HARQ-ACK on the carrier in the primary PUCCH group is lower than the priority of the PUSCH w/HARQ-ACK on the carrier in the secondary PUCCH group, therefore the PUSCH w/o HARQ-ACK in the sTTI n on the carrier in the primary PUCCH group will not be transmitted.

In the sTTI n+1, since the PUSCH w/o HARQ-ACK in the sTTI n on the carrier in the primary PUCCH group is not transmitted, the PUSCH w/o HARQ-ACK is in the sTTI n+1 on carrier in the secondary PUCCH group, therefore the priority of the uplink channel used to transmit the reference signal on the carrier in the primary PUCCH group is the lowest and thus will not be transmitted.

TABLE 5

| PUCCH Group | sTTI n | sTTI n + 1 |
| --- | --- | --- |
| A carrier in the primary PUCCH group | ~~PUSCH w/o HARQ-ACK~~ | ~~Reference signal~~ |
| A carrier in the secondary PUCCH group | PUSCH w/ HARQ-ACK | PUSCH w/o HARQ-ACK |

In Table 6, in the sTTI n, since the PUSCH w/o HARQ-ACK on the carrier in the primary PUCCH group is higher than the priority of the PUSCH w/o HARQ-ACK on the carrier in the secondary PUCCH group, therefore the PUSCH w/o HARQ-ACK in the sTTI n on the carrier in the secondary PUCCH group will not be transmitted.

Figure 4:
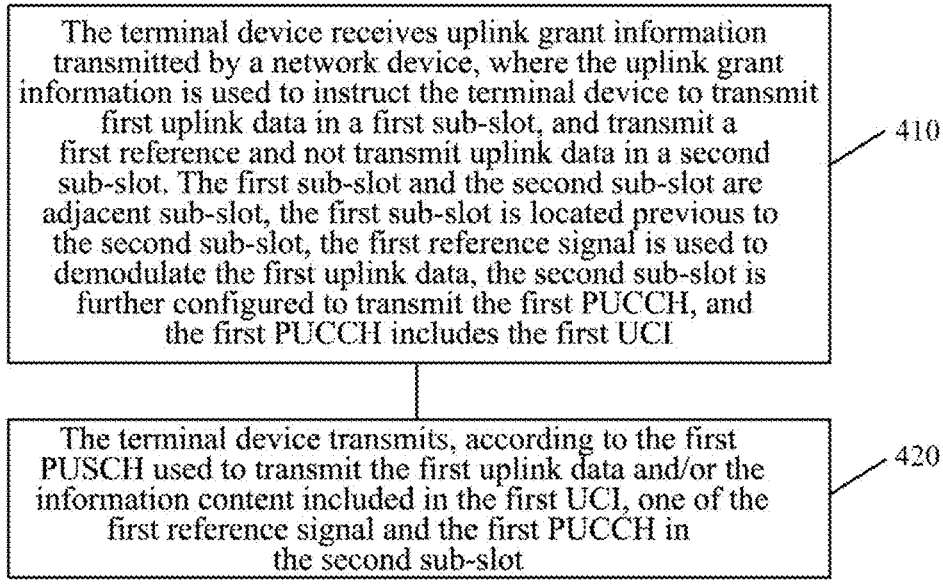
FIG. 4 is a schematic flowchart of a method for transmitting an uplink signal according to another embodiment of the present application.

In the sTTI n+1, it is assumed that the priority is determined using the foregoing mode 2 or mode 4, the PUSCH w/o HARQ-ACK is transmitted on the carrier in the secondary PUCCH group, and the reference signal transmitted in the sTTI n+1 on the carrier in the primary PUCCH group is used to demodulate the PUSCH w/o HARQ-ACK transmitted in the sTTI n. Since the priority of the uplink channel used to transmit the reference signal in the sTTI n+1 on the carrier in the primary PUCCH group is between the priority of the uplink channel without HARQ-ACK without reference signal in the sub-slot and the priority of the uplink channel without HARQ-ACK with reference signal in the sub-slot, therefore the uplink channel used to transmit the reference signal in the sTTI n+1 on the carrier in the primary PUCCH group will not be transmitted when the uplink channel in the sTTI n+1 on the carrier in the secondary PUCCH group includes the reference signal, and the PUSCH w/o HARQ-ACK on the carrier in the secondary PUCCH group will not be transmitted when the uplink channel in the sTTI n+1 on the carrier in the secondary PUCCH group does not include the reference signal.

be performed by a terminal device, which may be, for example, the terminal device 120 shown in FIG. 1. As shown in FIG. 4, the method 400 for transmitting the uplink signal may include some or all of the following steps. Where:

in 410, receiving, by a terminal device, uplink grant information transmitted by a network device, where the uplink grant information is used to instruct the terminal device to transmit first uplink data in a first sub-slot, and transmit a first reference and not transmit uplink data in a second sub-slot.

Where the first sub-slot and the second sub-slot are adjacent sub-slot, the first sub-slot is located previous to the second sub-slot, the first reference signal is used to demodulate the first uplink data, the second sub-slot is also configured to transmit the first PUCCH, and the first PUCCH includes the first uplink control information (UCI).

In 420, transmitting, by the terminal device, according to a first PUSCH used to transmit the first uplink data and/or the information content included in the first UCI, one of the first reference signal and the first PUCCH in the second sub-slot.

Specifically, the terminal device receives the uplink grant information, and the uplink grant information instructs the terminal device to transmit the first uplink data in the first sub-slot, and transmit the first reference signal used to demodulate the first uplink data in the second sub-slot and

TABLE 6

| PUCCH Group | sTTI n | sTTI n + 1 | |
|---|---|---|---|
| A carrier in the primary PUCCH group | PUSCH w/o HARQ-ACK | Reference signal | ~~Reference signal~~ |
| A carrier in the secondary PUCCH group | ~~PUSCH w/o HARQ-ACK~~ | ~~PUSCH w/o HARQ-ACK (w/o reference signal)~~ | PUSCH w/o HARQ-ACK (w/reference signal) |

It should be understood that, in the embodiments of the present application, when the total transmitting power used to transmit the first uplink channel and other uplink channels in the first sub-slot exceeds the maximum transmitting power of the terminal device and if the terminal device determines, according to the priority of the uplink channel, to transmit the other uplink channels in the first sub-slot, then the terminal device may not transmit the first uplink channel in the first sub-slot; or, if there is still remaining power after other uplink channels are transmitted at normal power, then the remaining power may be used to transmit the first uplink channel.

In an embodiment, since the reference signal on the second uplink channel is used to demodulate the uplink data in the first uplink channel, when the transmitting power of the first uplink channel is reduced and if the second uplink channel may be normally transmitted, then the second uplink channel should also be transmitted using the same transmitting power as that of the first uplink channel, so as to ensure the demodulation performance of the first uplink channel.

In an embodiment, if the first uplink channel is transmitted according to the normal power and the second uplink channel is required to reduce the transmitting power due to power limitation and the lower channel priority, the second uplink channel may not be transmitted.

FIG. 4 is a schematic flowchart of a method 400 for transmitting an uplink signal according to an embodiment of the present application. The method described in FIG. 4 may not transmit the uplink data. It can be understood that the terminal device is scheduled to transmit DD|R in the first sub-slot and R thereof is transmitted in the second sub-slot, and the transmission of the uplink data of the terminal device is not scheduled in the second sub-slot. If the terminal device also transmits the first PUCCH in the second sub-slot (for example, the terminal device performs HARQ-ACK feedback on the downlink transmission data in the second sub-slot, or the terminal device performs CSI reporting), then the terminal device performs, based on the information content included in the first PUSCH that is demodulated by the reference signal and the information content included in the first PUCCH, the transmission of the uplink channel in the second sub-slot.

In an embodiment, the first PUCCH may collide with the reference signal in the second sub-slot on the same carrier, and the first PUCCH may collide with the reference signal in the second sub-slot on different carriers. For example, one is on the first carrier and the other is on the second carrier, where the first carrier is a carrier in the primary physical uplink control channel (PUCCH) group configured for the terminal device, and the second carrier is a carrier in the secondary PUCCH group configured for the terminal device.

Where the first UCC is included in the first PUCCH. The first UCI may include at least one of HARQ-ACK information, scheduling request information and Channel State Information (CSI), where the CSI includes at least one of a Rank Indication (RI), a Precoding Matrix Indicator (PMI) and a Channel Quality Indicator (CQI).

Therefore, in the embodiments of the present application, when the terminal device does not perform the concurrent transmission of the uplink channel, the terminal device performs, based on the information content included in the PUSCH that is demodulated by the reference signal and the information content included in the PUCCH, the transmission of the uplink channel during the time period, so as to ensure that important uplink control information can be transmitted and demodulated.

In this embodiment, the terminal device does not have a capability of uplink channel concurrent transmission; or, the terminal device has a capability of uplink channel concurrent transmission but is configured to not perform the uplink channel concurrent transmission.

It should be understood that the UCI may or may not be included in the first uplink data.

In an embodiment, if the first PUSCH does not include the UCI, or the first PUSCH includes the second UCI and the second UCI does not include the HARQ-ACK information, then in 420, the transmitting, by the terminal device, one of the first reference signal and the first PUCCH in the second sub-slot, includes: transmitting, by the terminal device, the first PUCCH in the second sub-slot.

For example, as shown in Table 7, the PUSCH and the PUCCH do not collide in the sTTI n, and only collide in the sTTI n+1. Since the PUSCH transmitted in the sTTI n does not include the HARQ-ACK, the reference signal in the sTTI n+1 will not be transmitted.

TABLE 7

|  | sTTI n | sTTI n + 1 |
|---|---|---|
| PUSCH | PUSCH w/o HARQ-ACK | ~~Reference signal~~ |
| PUCCH | None | PUCCH |

For another example, as shown in Table 8, the PUSCH and the PUCCH collide on both the sTTI n and the sTTI n+1. In the sTTI n, the PUCCH includes the UCI but the HARQ-ACK is not included in the UCI, and the UCI can be transmitted on the PUSCH. Thus, since the PUSCH transmitted in the sTTI n does not include the HARQ-ACK, the reference signal in the sTTI n+1 will not be transmitted.

TABLE 8

|  | sTTI n | sTTI n + 1 |
|---|---|---|
| PUSCH | PUSCH (PUCCH w/ UCI) | ~~Reference signal~~ |
| PUCCH | ~~PUCCH w/UCI (w/o HARQ-ACK)~~ | PUCCH |

In an embodiment, if the first PUSCH includes the second UCI and the second UCI includes the HARQ-ACK information, in 420, the transmitting, by the terminal device, one of the first reference signal and the first PUCCH in the second sub-slot, includes: transmitting, by the terminal device, the first reference signal in the second sub-slot.

For example, as shown in Table 9, PUSCH and PUCCH collide on both the sTTI n and the sTTI n+1. In the sTTI n, the PUCCH includes the HARQ-ACK that may be transmitted on the PUSCH. Thus, since the PUSCH transmitted in the sTTI n includes the HARQ-ACK, the PUCCH is not transmitted but the reference signal is transmitted in the sTTI n+1 to demodulate the PUSCH in the sTTI n.

TABLE 9

|  | sTTI n | sTTI n + 1 |
|---|---|---|
| PUSCH | PUSCH (PUCCH w/ HARQ-ACK) | ~~Reference signal~~ |
| PUCCH | ~~PUCCH w/ HARQ-ACK~~ | ~~PUCCH~~ |

In an embodiment, if the first UCI includes the HARQ-ACK information, the method further includes: transmitting, by the terminal device, the HARQ-ACK information in the first UCI in the first sub-slot.

For example, as shown in Table 10, the PUSCH and the PUCCH collide on both the sTTI n and the sTTI n+1. In the sTTI n, the PUCCH includes the HARQ-ACK1 that may be transmitted on the PUSCH. Thus, since the PUSCH transmitted in the sTTI n includes the HARQ-ACK1, the PUCCH is not transmitted but the reference signal is transmitted in the sTTI n+1 to demodulate the PUSCH in the sTTI n. However, it is considered that the PUCCH in the sTTI n+1 includes the HARQ-ACK2, in order to ensure the transmission of the HARQ-ACK2, the HARQ-ACK2 may also be transmitted in the PUSCH of the sTTI n.

TABLE 10

|  | sTTI n | sTTI n + 1 |
|---|---|---|
| PUSCH | PUSCH (w/ HARQ-ACK1 w/ HARQ-ACK2) | Reference signal |
| PUCCH | ~~PUCCH w/HARQ-ACK1~~ | ~~PUCCH w/HARQ-ACK2~~ |

In an embodiment, if the first UCI includes the HARQ-ACK information, the method further includes: transmitting, by the terminal device, the first PUCCH in the second sub-slot.

For example, as shown in Table 11, the PUSCH and the PUCCH collide on both the sTTI n and the sTTI n+1. In the sTTI n, the PUCCH includes HARQ-ACK1 that may be transmitted on the PUSCH. However, it is considered that the PUCCH transmitted in the sTTI n+1 includes the HARQ-ACK2 and the priority of the HARQ-ACK2 in the sTTI n+1 is higher than the priority of the reference signal, therefore the reference signal is not transmitted but the PUCCH is transmitted in the sTTI n+1.

TABLE 11

|  | sTTI n | sTTI n + 1 |
|---|---|---|
| PUSCH | PUSCH (PUCCH w/HARQ-ACK1) | ~~Reference signal~~ |
| PUCCH | ~~PUCCH w/HARQ-ACK1~~ | PUCCH w/ HARQ-ACK2 |

In an embodiment, if the first UCI does not include the HARQ-ACK information, the method further includes: transmitting, by the terminal device, the first reference signal in the second sub-slot, if the first PUSCH includes the second UCI and the second UCI includes the HARQ-ACK information.

For example, as shown in Table 12, the PUSCH and the PUCCH collide on both the sTTI n and the sTTI n+1. In the sTTI n, the PUCCH includes a HARQ-ACK that may be transmitted on the PUSCH. The PUCCH transmitted in the sTTI n+1 does not include the HARQ-ACK. Therefore, PUCCH is not transmitted but the reference signal is transmitted in the sTTI n+1 to demodulate the PUSCH in the sTTI n+1.

TABLE 12

|  | sTTI n | sTTI n + 1 |
|---|---|---|
| PUSCH | PUSCH (PUCCH w/ HARQ-ACK) | Reference signal |
| PUCCH | ~~PUCCH w/ HARQ-ACK~~ | ~~PUCCH w/UCI (w/o HARQ-ACK)~~ |

In an embodiment, if the first UCI does not include the HARQ-ACK information, the method further includes: transmitting, by the terminal device, the first PUCCH in the second sub-slot, if the first PUSCH does not include the UCI, or the first PUSCH includes the second UCI and the second UCI does not include the HARQ-ACK information.

For example, as shown in Table 13, the reference signal and the PUCCH collide in the sTTI n+1. The PUSCH transmitted in the sTTI n does not include the HARQ-ACK, although the PUCCH transmitted in the sTTI n+1 does not include the HARQ-ACK either, yet the UCI is not retransmitted and the uplink data is retransmitted, so the priority of the UCI may be considered to be higher than the priority of the uplink data. Therefore, the reference signal is not transmitted but the PUCCH is transmitted in the sTTI n+1.

TABLE 13

|  | sTTI n | sTTI n + 1 |
|---|---|---|
| PUSCH | PUSCH w/o HARQ-ACK | ~~Reference signal~~ |
| PUCCH | None | PUCCH w/UCI (w/o HARQ-ACK) |

In an embodiment, if the first UCI does not include the HARQ-ACK information, the method further includes: transmitting, by the terminal device, the first reference signal in the second sub-slot, if the first PUSCH includes the second UCI and the second UCI does not include the HARQ-ACK information.

In an embodiment, in 420, the transmitting, by the terminal device, one of the first reference signal and the first PUCCH in the second sub-slot, includes: transmitting, by the terminal device, the first PUCCH in the second sub-slot.

In an embodiment, in 420, the transmitting, by the terminal device, one of the first reference signal and the first PUCCH in the second sub-slot, includes: transmitting, by the terminal device, the first reference signal in the second sub-slot.

In an embodiment, in 420, the transmitting, by the terminal device, one of the first reference signal and the first PUCCH in the second sub-slot, includes: transmitting, by the terminal device, the first PUCCH in the second sub-slot in case the first UCI includes the HARQ-ACK information; and/or transmitting, by the terminal device, the first reference signal in the second sub-slot in case the first UCI does not include the HARQ-ACK information.

In an embodiment, in 420, the uplink channel transmission may also be performed based on the modes shown in Table 14 and Table 15 when the PUSCH collides with the PUCCH.

As shown in Table 14, the PUSCH and the PUCCH collide on both the sTTI n and the sTTI n+1. Then, the PUCCH is transmitted but the PUSCH is not transmitted on both the sTTI n and the sTTI n+1.

TABLE 14

|  | sTTI n | sTTI n + 1 |
|---|---|---|
| PUSCH | ~~PUSCH~~ | ~~Reference signal~~ |
| PUCCH | PUCCH | PUCCH |

As shown in Table 15, the PUSCH and the PUCCH collide on both the sTTI n and the sTTI n+1. Then, the PUSCH is transmitted but the PUCCH is not transmitted on both the sTTI n and the sTTI n+1, and the UCI carried in the PUCCH is transmitted on the PUSCH on the same TTI.

TABLE 15

|  | sTTI n | sTTI n + 1 |
|---|---|---|
| PUSCH | PUSCH (PUCCH w/UCI1) | Reference signal (PUCCH w/UCI2) |
| PUCCH | ~~PUCCH w/UCI1~~ | ~~PUCCH w/UCI2~~ |

It can be perceived that, when the uplink channel used to transmit the reference signal and the PUCCH overlap in the time domain, the terminal device performs the transmission of the uplink channel within the time period based on the information content included in the PUSCH that is demodulated by the reference signal and the information content included in the PUCCH, so when the PUSCH carries more important uplink control information, the PUSCH may be ensured to be demodulated by the reference signal; and in some cases, when the PUCCH carries the important uplink control information, the important uplink control information included in the PUCCH may be transmitted in the PUSCH.

In an embodiment, since the PUCCH may be used to transmit the scheduling request information, but the scheduling request information cannot be transmitted on the PUSCH, when the PUCCH carries the scheduling request information, the priority of the PUCCH and the priority of the PUCCH carrying the HARQ-ACK may be considered to be the same.

In an embodiment, if the first UCI includes at least one of the scheduling request information and the HARQ information (for example, the HARQ-ACK), the method further including: transmitting, by the terminal device, the first PUCCH in the second sub-slot.

In an embodiment, if the first UCI includes the scheduling request information and does not include the HARQ information, the method further includes: if the first PUSCH does not include the UCI, or the first PUSCH includes the second UCI and the second UCI does not include the HARQ-ACK information, the terminal device transmits the first PUCCH in the second sub-slot; and/or, if the first PUSCH includes the second UCI and the second UCI includes the HARQ-ACK information, the terminal device transmits the first reference signal in the second sub-slot.

It should be noted that, in the case of no collision, each of the embodiments and/or the technical feature in each of the embodiments described in the present application may be combined with each other arbitrarily, and the resulting technical solutions shall also fall within the scope of protection of the present application.

It should be understood that in each of the embodiments of the present application, the sequence numbers of each the above processes do not imply a sequence of executions, and the execution sequence of each of processes should be determined by its function and internal logic, and should not constitute any limitation on the implementation process of the embodiments of the present application.

The communication method according to the embodiment of the present application is described in detail above. Hereinafter, the apparatus according to the embodiment of the present application will be described with reference to FIG. 5 to FIG. 8, and the technical features described in the method embodiment are applicable to the following apparatus embodiment.

Figure 5:
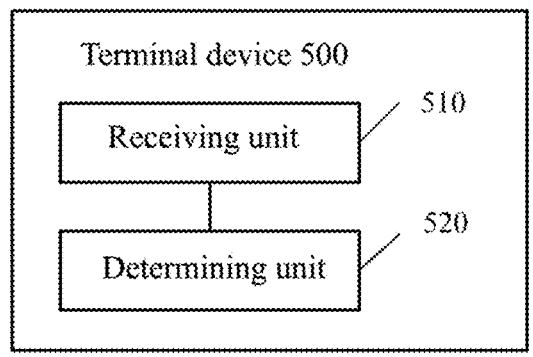
FIG. 5 is a schematic block diagram of a terminal device according to an embodiment of the present application.

FIG. 5 is a schematic block diagram of a terminal device 500 according to an embodiment of the present application. As shown in FIG. 5, the terminal device 500 includes a receiving unit 510 and a determining unit 520. Where:

the receiving unit is configured to receive uplink grant information transmitted by a network device, and the uplink grant information is used to instruct the terminal device to transmit a first uplink channel in a first sub-slot and to transmit a second uplink channel in a second sub-slot, where the first uplink channel includes first uplink data and does not include a reference signal, the second uplink channel includes the first reference signal, the first sub-slot and the second sub-slot are adjacent sub-slot on a first carrier, the first sub-slot is located previous to the second sub-slot, and the first reference signal is used to demodulate the first uplink data;

the determining unit is configured to determine, according to a priority of an uplink channel, whether to transmit the first uplink channel in the first sub-slot, where the priority of the uplink channel from low to high includes: an uplink channel without Hybrid Automatic Repeat request-Acknowledgement (HARQ-ACK) on a subframe; an uplink channel without HARQ-ACK in a slot; an uplink channel without HARQ-ACK without reference signal in a sub-slot; an uplink channel without HARQ-ACK with reference signal in a sub-slot; an uplink channel with HARQ-ACK on a subframe; an uplink channel with HARQ-ACK in a slot; and an uplink channel with HARQ-ACK in a sub-slot.

Therefore, when the total transmitting power used to transmit different uplink channels within the same time period exceeds the maximum transmitting power of the terminal device, the terminal device performs the transmission of the uplink channel within the time period based on the priority of the uplink channel. Since the priority of the uplink channel without HARQ-ACK is lower than the priority of the uplink channel with HARQ-ACK, the important HARQ-ACK is preferentially ensured to be normally transmitted; then, since the shorter the length of the TTI used to transmit the uplink channel is, the higher the priority of the transmitted uplink channel becomes, so the more urgent uplink channel may be ensured to be preferentially transmitted.

In an embodiment, if the first uplink channel does not include the HARQ-ACK, a priority of the first uplink channel is equal to the priority of the uplink channel without HARQ-ACK with reference signal in the sub-slot, or is equal to the priority of the uplink channel without HARQ-ACK without reference signal in the sub-slot.

In an embodiment, if the terminal device determines, according to the priority of the uplink channel, to transmit the first uplink channel in the first sub-slot, the determining unit is further configured to: determine whether to transmit the second uplink channel in the second sub-slot according to the priority of the uplink channel, where if the first uplink channel includes the HARQ-ACK, the priority of the second uplink channel is equal to the priority of the uplink channel with HARQ-ACK in the sub-slot.

In an embodiment, if the terminal device determines, according to the priority of the uplink channel, to transmit the first uplink channel in the first sub-slot, the determining unit is further configured to: determine whether to transmit the second uplink channel in the second sub-slot according to the priority of the uplink channel, where if the first uplink channel does not include the HARQ-ACK, the priority of the second uplink channel is equal to the priority of the uplink channel without HARQ-ACK with reference signal in the sub-slot; or, the priority of the second uplink channel is between the priority of the uplink channel without HARQ-ACK without reference signal in the sub-slot and the priority of the uplink channel without HARQ-ACK with reference signal in the sub-slot.

In an embodiment, if the terminal device determines, according to the priority of the uplink channel, to transmit the first uplink channel in the first sub-slot, the determining unit is further configured to: determine whether to transmit the second uplink channel in the second sub-slot according to the priority of the uplink channel.

Where the priority of the second uplink channel is equal to the priority of the uplink channel without HARQ-ACK with reference signal in the sub-slot; or, the priority of the second uplink channel is between the priority of the uplink channel without HARQ-ACK without reference signal in the sub-slot and the priority of the uplink channel without HARQ-ACK with reference signal in the sub-slot.

In an embodiment, if the terminal device determines, according to the priority of the uplink channel, not to transmit the first uplink channel in the first sub-slot, the determining unit is further configured to: determine not to transmit the second uplink channel in the second sub-slot.

In an embodiment, if the terminal device determines, according to the priority of the uplink channel, not to transmit the first uplink channel in the first sub-slot, the determining unit is further configured to: determine whether to transmit the second uplink channel in the second sub-slot according to the priority of the uplink channel, where the priority of the second uplink channel is the lowest.

In an embodiment, in the case that whether the uplink channel includes the HARQ-ACK and whether the uplink channel includes the reference signal has same situation, a priority of an uplink channel transmitted on a second carrier is lower than a priority of an uplink channel transmitted on the first carrier.

Where the first carrier is a carrier in a primary physical uplink control channel (PUCCH) group configured for the terminal device, and the second carrier is a carrier in a secondary PUCCH group configured for the terminal device.

In an embodiment, the terminal device has a capability of uplink channel concurrent transmission for different time lengths, and is configured to be able to perform the uplink channel concurrent transmission for different time lengths.

It should be understood that the communication device 500 may perform the corresponding operations performed by the terminal device in the foregoing method 300, which will not be repeated herein for brevity.

Figure 6:
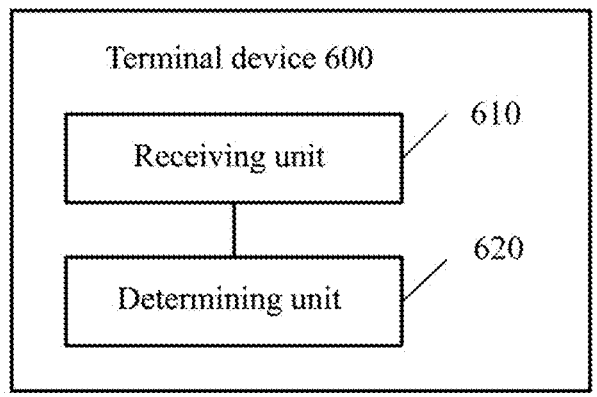
FIG. 6 is a schematic block diagram of a terminal device according to another embodiment of the present application.

FIG. 6 is a schematic block diagram of a terminal device 600 according to an embodiment of the present application. As shown in FIG. 6, the terminal device 600 includes a receiving unit 610 and a transmitting unit 620. Where:

the receiving unit is configured to receive uplink grant information transmitted by a network device, and the uplink grant information is used to instruct the terminal device to transmit first uplink data in a first sub-slot, and transmit a first reference signal and not transmit uplink data in a second sub-slot, where the first sub-slot and the second sub-slot are adjacent sub-slot, the first sub-slot is located previous to the second sub-slot, the first reference signal is used to demodulate the first uplink data, the second sub-slot is further configured to transmit a first physical uplink control channel (PUCCH), and the first PUCCH includes first uplink control information (UCI);

the transmitting unit is configured to transmit, according to the first Physical Uplink Shared Channel (PUSCH) used to transmit the first uplink data and/or information content included in the first UCI, one of the first reference signal and the first PUCCH in the second sub-slot.

Therefore, when the total transmitting power used to transmit the reference signal and the PUCCH within the same time period exceeds the maximum transmitting power of the terminal device, the terminal device performs the transmission of the uplink channel within the time period based on the information content included in PUSCH that is demodulated by the reference signal and the information content included in the PUCCH, so as to ensure that important uplink control information can be transmitted and demodulated.

In an embodiment, the first PUSCH does not include a UCI, or the first PUSCH includes a second UCI, and the second UCI does not include Hybrid Automatic Repeat request-Acknowledgement (HARQ-ACK) information, where the transmitting unit is specifically configured to: transmit, by the terminal device, the first PUCCH in the second sub-slot.

In an embodiment, the first PUSCH includes the second UCI, and the second UCI includes the HARQ-ACK information, where the transmitting unit is specifically configured to: transmit, by the terminal device, the first reference signal in the second sub-slot.

In an embodiment, the first UCI includes the HARQ-ACK information, and the transmitting unit is further configured to: transmit the HARQ-ACK information in the first UCI in the first sub-slot.

In an embodiment, the first UCI includes the HARQ-ACK information, and the transmitting unit is further configured to: transmit the first PUCCH in the second sub-slot.

In an embodiment, the first UCI does not include the HARQ-ACK information, and the transmitting unit is further configured to: transmit the first reference signal in the second sub-slot if the first PUSCH includes the second UCI and the second UCI includes the HARQ-ACK information; and/or, transmit the first PUCCH in the second sub-slot if the first PUSCH does not include the UCI, or the first PUSCH includes the second UCI and the second UCI does not include the HARQ-ACK information.

In an embodiment, the terminal device does not have a capability of uplink channel concurrent transmission; or, the terminal device has a capability of uplink channel concurrent transmission but is configured to not perform the uplink channel concurrent transmission.

It should be understood that the communication device 600 may perform corresponding operations performed by the terminal device in the foregoing method 400, which will not be repeated herein for brevity.

Figure 7:
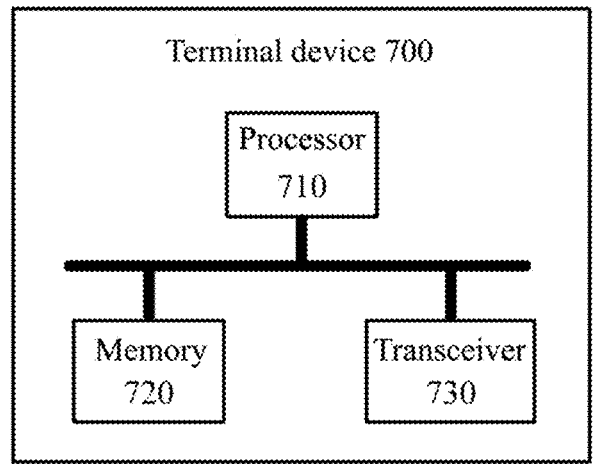
FIG. 7 is a schematic structural diagram of a terminal device according to an embodiment of the present application.

FIG. 7 is a schematic structural diagram of a terminal device 700 according to an embodiment of the present application. As shown in FIG. 7, the terminal device includes a processor 710 that may call and run a computer program from the memory to implement a corresponding process implemented by the terminal device in each of methods according to the embodiments of the present application, which will not be repeated herein for brevity.

In an embodiment, as shown in FIG. 7, the communication device 700 may further include a memory 720. Where the processor 710 may call and run a computer program from the memory 730 to implement the method according to the embodiments of the present application.

Where the memory 720 may be a separate device independent of the processor 710 or may be integrated in the processor 710.

In an embodiment, as shown in FIG. 7, the communication device 700 may further include a transceiver 730, and the processor 710 may control the transceiver 730 to communicate with other devices, in particular, may transmit information or data to other devices, or may receive the information or data transmitted by other devices.

Where the transceiver 730 may include a transmitter and a receiver. The transceiver 730 may further include an antenna, and the number of the antennas may be one or more.

Figure 8:
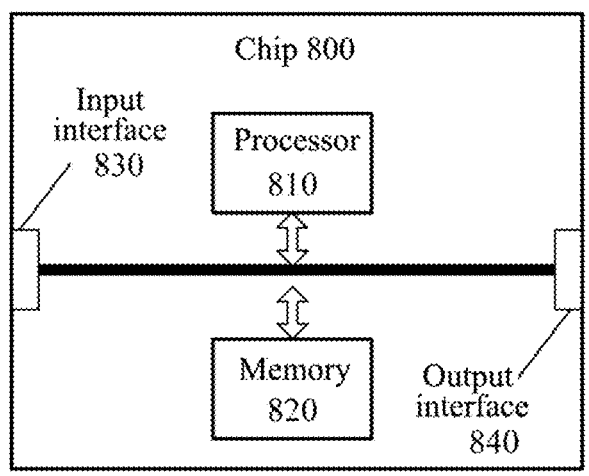
FIG. 8 is a schematic structural diagram of a chip according to an embodiment of the present application.

FIG. 8 is a schematic structural diagram of a chip according to an embodiment of the present application. The chip 800 shown in FIG. 8 includes a processor 810 that may call and run a computer program from a memory to implement the method according to the embodiments of the present application.

Where the memory 820 may be a separate device independent of the processor 810 or may be integrated in the processor 810.

In an embodiment, the chip 800 may also include an input interface 830. Where the processor 810 may control the input interface 830 to communicate with other devices or chips, specifically, may obtain information or data transmitted by other devices or chips.

In an embodiment, the chip 800 may also include an output interface 840. The processor 810 may control the output interface 840 to communicate with other devices or chips, specifically, may output information or data to other devices or chips.

In an embodiment, the chip may be applied to the terminal device according to the embodiments of the present application, and the chip may implement the corresponding process implemented by the terminal device in each of methods according to the embodiments of the present application, which will not be repeated herein for brevity.

It should be understood that the chip mentioned in the embodiments of the present application may also be referred to as a system level chip, a system chip, a chip system or a system on chip, etc.

The processor described above may be a general purpose processor, a digital signal processor (DSP), a field programmable gate array (FPGA), an application specific integrated circuit (ASIC) or other programmable logic devices, transistor logic devices, discrete hardware components, etc. Where the general purpose processor described above may be a microprocessor or may also be any conventional processor, etc.

The memory described above may be a volatile memory or a non-volatile memory, or may include both the volatile memory and the non-volatile memory. Where the non-volatile memory may be a read-only memory (ROM), a programmable read only memory (PROM), an erasable PROM (EPROM), or an electrical EPROM (EEPROM), or a flash memory. The volatile memory may be a random access memory (RAM).

It should be understood that the above mentioned memory is exemplary but not limited. For example, the memory in the embodiments of the present application may also be a static RAM (SRAM), a dynamic RAM (DRAM), or a synchronous DRAM (SDRAM), a double data rate SDRAM (DDR SDRAM), an enhanced SDRAM (ESDRAM), a synch link DRAM (SLDRAM), a direct rambus RAM (DR RAM), etc. That is, the memory in the embodiments of the present application is intended to include, but is not limited to, these and any other suitable type of memory.

It should be understood that in the embodiments of the present disclosure, "B corresponding to A" indicates that B is associated with A, and B may be determined according to A. However, it should also be understood that B being determined according to A does not mean that B is only determined according to A, and that B may also be determined according to A and/or other information.

Those of ordinary skill in the art will appreciate that units and algorithm steps of each of examples described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, the specific working process of the system, the apparatus and the unit described above may refer to corresponding processes in the foregoing method embodiments, which will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation, for example, multiple units or components may be combined or be integrated into another system, or some features may be ignored or not be executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for implementing the purpose of the solution of the present embodiment.

In addition, each of functional units in each of the embodiments of the present application may be integrated into one processing unit, or each unit may physically exist, or two or more units may also be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes several instructions for enabling a computer device (which may be a personal computer, a server, or a network device, etc.) to perform all or part of the steps described in methods in each of the embodiments of the present application. The foregoing storage medium includes various medium that may store program code, such as a U disk, a mobile hard disk, a read-only memory (ROM), a random access memory (RAM), a magnetic disk, or an optical disk, etc.

The above is only a specific implementation form of the present application, but the scope of protection of the present application is not limited thereto, and any changes or substitutions that may easily be derived by those skilled in the art within the technical scope disclosed in the present application should be covered by the scope of protection of the present application. Therefore, the scope of protection of the present application should be subject to the scope of protection of the claims.

What is claimed is:

1. A method for transmitting an uplink signal, wherein the method comprises:
   receiving, by a terminal device, uplink grant information transmitted by a network device, wherein the uplink grant information is used to instruct the terminal device to transmit a first uplink channel in a first sub-slot and to transmit a second uplink channel in a second sub-slot, wherein the first uplink channel comprises uplink data and does not comprise a reference signal, the second uplink channel comprises a reference signal and does not comprise uplink data, the first sub-slot and the second sub-slot are adjacent sub-slots on a first carrier, the first sub-slot is prior to the second sub-slot, and the reference signal comprised in the second uplink channel is used to demodulate the uplink data comprised in the first uplink channel; and
   when there are at least two uplink channels overlapping in the first sub-slot and a total transmitting power for transmitting the at least two uplink channels exceeds a maximum transmitting power of the terminal device, determining, by the terminal device, whether to transmit the first uplink channel in the first sub-slot according to a priority of uplink channel,
   Wherein priorities of uplink channels are ranked from low to high as follows;
   an uplink channel without Hybrid Automatic Repeat request-Acknowledgement (HARQ-ACK) on a subframe;
   an uplink channel without HARQ-ACK in a slot;
   an uplink channel without HARQ-ACK without reference signal in a sub-slot;
   an uplink channel without HARQ-ACK with reference signal in a sub-slot;
   an uplink channel with HARQ-ACK on a subframe;
   an uplink channel with HARQ-ACK in a slot;
   an uplink channel with HARQ-ACK in a sub-slot;
   and wherein if the first uplink channel does not comprise the HARQ-ACK, the determining, by the terminal device, whether to transmit the first uplink channel in the first sub-slot according to the priority of uplink channel comprises:
   determining a priority of the first uplink channel to be the priority of uplink channel without HARQ-ACK with reference signal in a sub-slot; and
   determining whether to transmit the first uplink channel in the first sub-slot according to the priority of the uplink channel.

2. A terminal device, comprising a processor, a transceiver, and a memory, and the memory is configured to store an instruction, and the processor is configured to execute the instruction to:

control the transceiver to receive uplink grant information transmitted by a network device, wherein the uplink grant information is used to instruct the terminal device to transmit a first uplink channel in a first sub-slot and to transmit a second uplink channel in a second sub-slot, wherein the first uplink channel comprises uplink data and does not comprise a reference signal, the second uplink channel comprises reference signal and does not comprise the uplink data, the first sub-slot and the second sub-slot are adjacent sub-slots on a first carrier, the first sub-slot is prior to the second sub-slot, and the reference signal comprised in the second uplink channel is used to demodulate the uplink data comprised in the first uplink channel; and when there are at least two uplink channels overlapping in the first sub-slot and a total transmitting power for transmitting the at least two uplink channels exceeds a maximum transmitting power of the terminal device, determine, according to a priority of uplink channel, whether to transmit the first uplink channel in the first sub-slot, wherein priorities of uplink channels are ranked from low to high as follows:

an uplink channel without Hybrid Automatic Repeat request-Acknowledgement (HARQ-ACK) on a subframe;
an uplink channel without HARQ-ACK in a slot;
an uplink channel without HARQ-ACK without reference signal in a sub-slot;
an uplink channel without HARQ-ACK with reference signal in a sub-slot;
an uplink channel with HARQ-ACK on a subframe;
an uplink channel with HARQ-ACK in a slot;
an uplink channel with HARQ-ACK in a sub-slot;
wherein the processor is configured to execute the instruction to: if the first uplink channel does not comprise the HARQ-ACK,
determine a priority of the first uplink channel to be the priority of the uplink channel without HARQ-ACK with reference signal in a sub-slot; and
determine whether to transmit the first uplink channel in the first sub-slot according to the priority of the first uplink channel.

\* \* \* \* \*